United States Patent [19]

Shtulman

[11] Patent Number: 5,446,786

[45] Date of Patent: Aug. 29, 1995

[54] TWO-WIRE TELECOMMUNICATIONS LINE DETECTION ARRANGEMENTS

[75] Inventor: Alexander J. Shtulman, Tucker, Ga.

[73] Assignee: Northern Telecom Limited, Montreal, Canada

[21] Appl. No.: 25,568

[22] Filed: Mar. 3, 1993

[51] Int. Cl.$^6$ ............................................. H04M 3/22
[52] U.S. Cl. ...................................... 379/377; 379/252; 379/164
[58] Field of Search .................... 379/377, 252, 164

[56] References Cited

U.S. PATENT DOCUMENTS

| | | | |
|---|---|---|---|
| 4,110,569 | 8/1978 | Schindler et al. | 379/852 |
| 4,429,185 | 1/1984 | Adrian | 379/377 |
| 4,456,791 | 6/1984 | Forestier | 379/252 |
| 4,622,439 | 11/1986 | Kasbia et al. | 379/252 |
| 4,802,207 | 1/1989 | Uchida | 379/377 |
| 4,935,959 | 6/1990 | Markovic et al. | 379/252 |

Primary Examiner—James L. Dwyer
Assistant Examiner—Jacques M. Saint-Surin
Attorney, Agent, or Firm—Foley & Lardner

[57] ABSTRACT

A hook state detector for a two-wire telephone line includes two comparators each for comparing a voltage on a respective wire of the line with a respective reference voltage, and a logic circuit or software responsive to outputs of the comparators for determining off-hook and on-hook states when one of the compared voltages is more negative and the other is more positive than the respective reference voltages, and maintaining a previous hook state determination when both of the compared voltages are more positive, and when both of the compared voltages are more negative, than the respective reference voltages. The arrangement is insensitive to common mode induced a.c. on the line. The comparators can comprise differential amplifiers or opto-couplers.

8 Claims, 2 Drawing Sheets

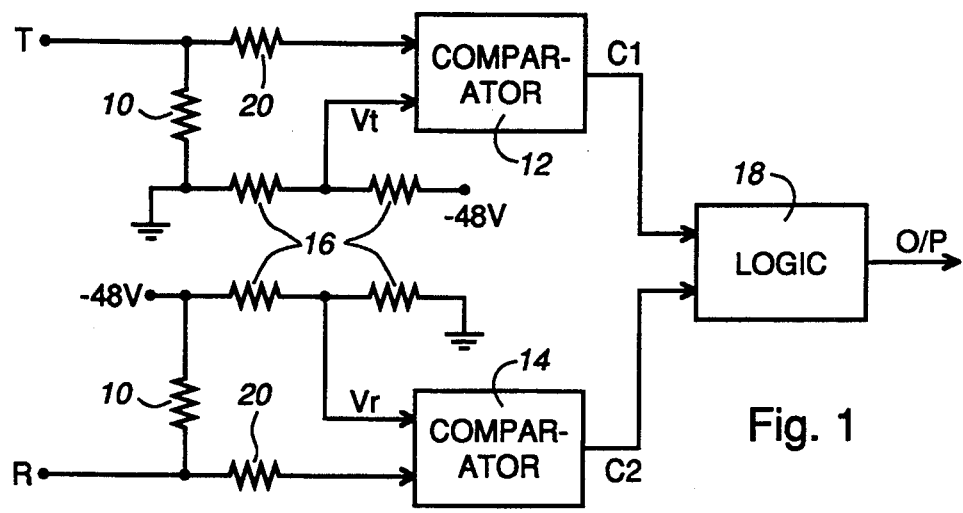
Fig. 1
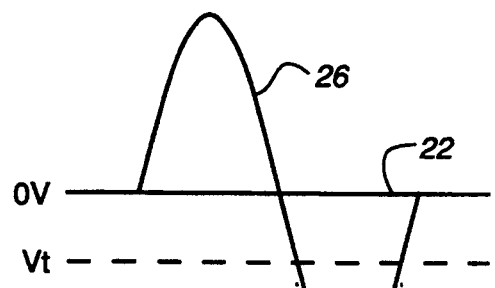
Fig. 2b
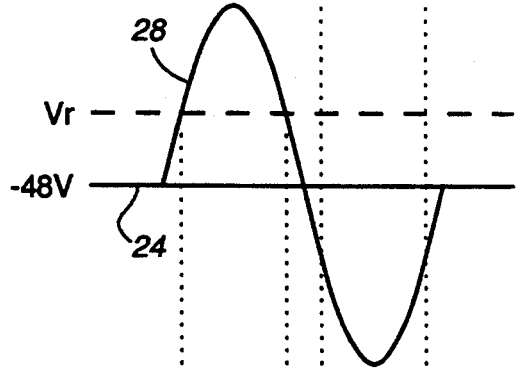
Fig. 2a
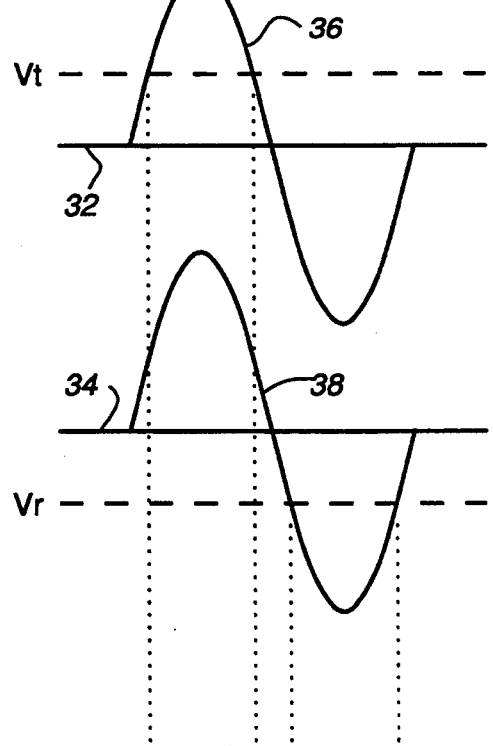

TWO-WIRE TELECOMMUNICATIONS LINE DETECTION ARRANGEMENTS

This invention relates to two-wire telecommunications line detection arrangements, such as loop closure and ring-ground detectors used for detecting the hook state of a telephone line, and to a method of detecting a state of a two-wire telecommunications line.

BACKGROUND OF THE INVENTION

It is well known to detect the level of current which flows from a supply voltage via feed resistors to a two-wire telephone line in order to determine the state of the line, i.e. whether the line is idle with the wires relatively disconnected, or active with the wires interconnected, at its end remote from the detector. Such detection arrangements suffer from a disadvantage in that the detection of the current, and hence of the state of the line, can be adversely influenced by common mode alternating currents induced on the line, for example from power lines. The induced a.c. can have large magnitudes, producing voltage swings of the order of 50 volts or more.

In order to reduce the sensitivity of such known line detection arrangements to induced a.c., it is known to couple the detector to the line via a filter. However, such a filter must be relatively transparent to d.c. signals while suppressing induced a.c. at frequencies of 50 or 60 Hz. Accordingly, the filter tends to be complicated and adds undesirably to costs and space requirements.

An object of this invention is to provide an improved two-wire telecommunications line detection arrangement.

SUMMARY OF THE INVENTION

According to one aspect of this invention there is provided a line detection arrangement for detecting a state of a two-wire telecommunications line having a first wire and a second wire, comprising: a first comparator arranged to compare a first voltage on the first wire of the line with a first reference voltage; a second comparator arranged to compare a second voltage on the second wire of the line with a second reference voltage, the second reference voltage being more negative than the first reference voltage; and logic responsive to outputs of the first and second comparators for determining a first state of the line when the first voltage is more negative than the first reference voltage and the second voltage is more positive than the second reference voltage, determining a second state of the line when the first voltage is more positive than the first reference voltage and the second voltage is more negative than the second reference voltage, and otherwise maintaining a previous determination of the state of the line.

In one embodiment of the invention, each of the first and second comparators comprises a differential amplifier, and may further comprise a level shifting circuit coupled to an output of the differential amplifier. In another embodiment, each of the first and second comparators comprises an opto-coupler including a light emitting diode. In the latter case preferably the light emitting diode of each opto-coupler is coupled between a respective terminal for connection of a respective wire of the line and the respective reference voltage with a polarity for emitting light in the first state of the line. so that power consumption is least in the second state (the on-hook state, which is the most common state) of the line.

The logic can comprise software, firmware, or hardware such as a bistable stage having two states corresponding to the first and second states of the line, and two gates each responsive to the outputs of the comparators for controlling the bistable stage. The logic effectively acts to provide a majority decision on the state of the line.

Thus viewed alteratively, the invention provides a detection arrangement comprising two comparators each arranged to compare a voltage on a respective wire of a two-wire telephone line with a respective reference voltage and to produce a respective comparator output signal indicating whether the line has a first state with a relatively low impedance between the two wires or a second state with a relatively high impedance between the two wires, and majority decision logic responsive to the two comparator output signals to determine the state of the line, whereby the detection arrangement is insensitive to common mode induced a.c. on the line.

The invention also provides a method of detecting a state of a two-wire telecommunications line, comprising the steps of: determining first and second reference voltages, the second reference voltage being more negative than the first reference voltage; determining a first state of the line in response to the voltage on a first one of the two wires of the line being more negative than the first reference voltage and the voltage on a second one of the two wires of the line being more positive than the second reference voltage; determining a second state of the line in response to the voltage on the first one of the two wires of the line being more positive than the first reference voltage and the voltage on a second one of the two wires of the line being more negative than the second reference voltage; and determining no change in the state of the line in response to the voltage on the first one of the two wires of the line being more positive than the first reference voltage and the voltage on the second one of the two wires of the line being more positive than the second reference voltage, and in response to the voltage on the first one of the two wires of the line being more negative than the first reference voltage and the voltage on the second one of the two wires of the line being more negative than the second reference voltage.

BRIEF DESCRIPTION OF THE DRAWINGS

The invention will be further understood from the following description with reference to the accompanying drawings, in which the same references are used in different figures to denote corresponding components and in which:

FIG. 1 schematically illustrates a general form of a line detection arrangement in accordance with the invention;

FIGS. 2a and 2b are voltage diagrams with reference to which the operation of the line detection arrangement is explained;

DETAILED DESCRIPTION

Figure 3:
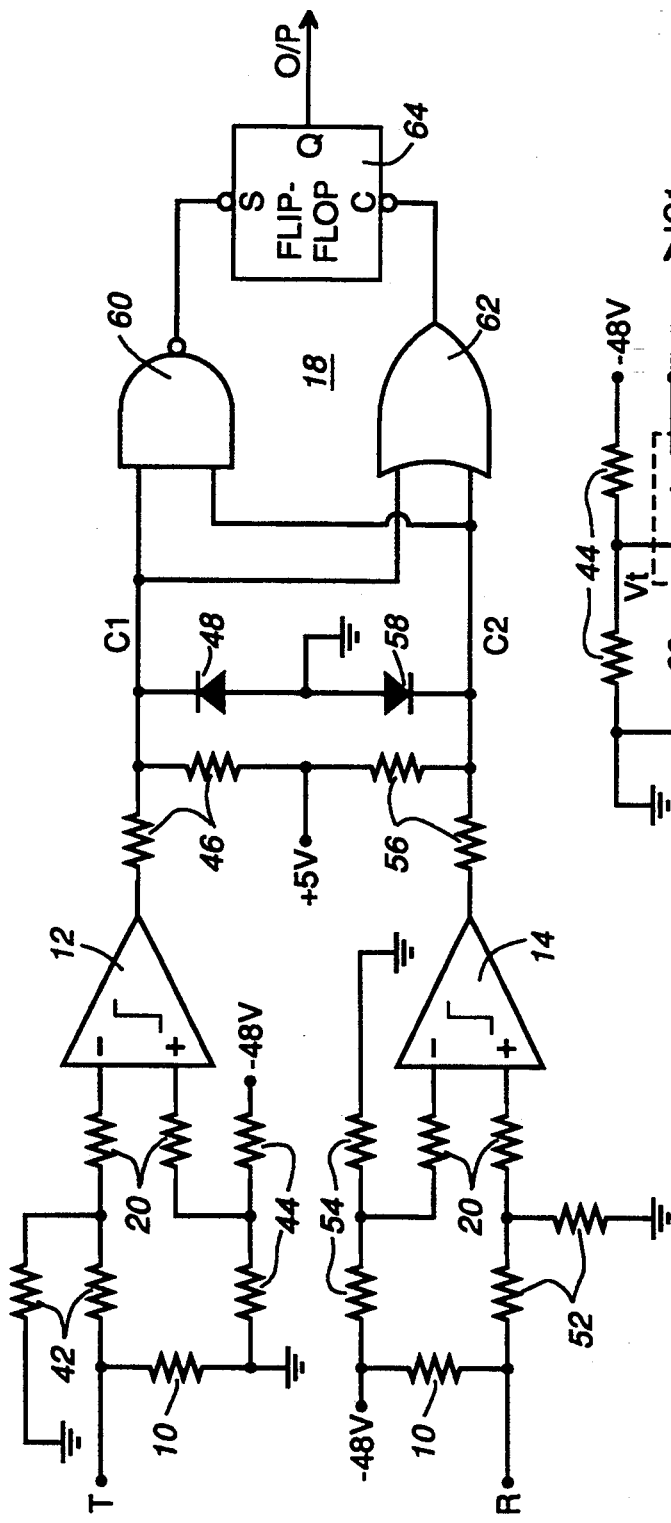
FIG. 3 is a circuit diagram illustrating a line detector in accordance with an embodiment of the invention.

Referring to FIG. 1, a line detection arrangement in accordance with an embodiment of the invention is illustrated together with two d.c. feed resistors 10 which are coupled in conventional manner between supply voltage terminals, −48 volts and ground (0 volts), and terminals R and T respectively. A two-wire line (not shown) has its tip wire connected to the terminal T and its ring wire connected to the terminal R.

The line detection arrangement comprises two voltage comparators 12 and 14, two potential dividers 16 shown as being constituted by resistors connected between the supply voltage terminals and providing reference voltages Vt and Vr for the comparators 12 and 14 respectively, and logic 18. The terminals T and R are coupled to inputs of the comparators 12 and 14 respectively via current limiting resistors 20.

The comparator 12 compares the voltage at the terminal T, referred to here as VT, with the reference voltage Vt and produces a binary output signal C1 which is a logic 0 when VT>Vt (VT is greater than, i.e. more positive than, Vt) and is a logic 1 when VT<Vt. Similarly, the comparator 14 compares the voltage at the terminal R, referred to here as VR, with the reference voltage Vr and produces a binary output signal C2 which is a logic 0 when VR<Vr (VR is less than, i.e. more negative than, Vr) and is a logic 1 when VR>Vr. The logic 18 is supplied with the signals C1 and C2 and produces a binary output signal O/P which is a logic 0 in response to both of the signals C1 and C2 being a logic 0, is a logic 1 in response to both of the signals C1 and C2 being a logic 1, and is unchanged from its prevailing value in response to either one of the signals C1 and C2 being a logic 0 with the other being a logic 1.

Thus the following is a truth table for the operation of the comparators 12 and 14 and the logic 18.

| VT < Vt<br>C1 | VR > Vr<br>C2 | O/P |
| --- | --- | --- |
| 0 | 0 | 0 |
| 0 | 1 | No Change |
| 1 | 0 | No Change |
| 1 | 1 | 1 |

Referring to FIGS. 2a and 2b, in which various voltages and the resulting logic values of the signals C1, C2, and O/P are shown as a function of time, the constant reference voltages Vt and Vr are represented by horizontal dashed lines, the reference voltage Vt being more negative than the 0 volt supply voltage, and the reference voltage Vr being more positive than the −48 volt supply voltage and being more negative than the reference voltage Vt. Thus 0V>Vt>Vr>−48 V.

FIG. 2a illustrates an on-hook state of the line, in which the telephone line presents a high impedance between the terminals T and R so that the d.c. voltages VT and VR at these terminals are substantially 0 V and −48 V respectively, as shown by lines 22 and 24 in FIG. 2a. In the absence of any induced a.c. on the telephone line, this results in the signals C1=0 and C2=0, so that O/P=0 indicating an on-hook state of the telephone line.

In the presence of an arbitrary magnitude of common mode induced a.c. on the telephone line, as shown by sinusoidal curves 26 and 28, in-phase a.c. signal waveforms are superimposed on the d.c. components of the voltages VT and VR. If the induced a.c. is of a sufficient magnitude, then as shown in FIG. 2a the voltages VT and VR cross the reference voltages Vt and Vr respectively at points during the sinusoidal waveform, resulting in the signals C1=1 and C2=1 at certain times as shown at the bottom of FIG. 2a. However, because the signal C2=0 throughout the time during which the signal C1=1, and the signal C1=0 throughout the time during which the signal C2=1, there is no change in the signal O/P, which in accordance with the above truth table remains 0. Thus the telephone line is correctly indicated by the signal O/P as being in the on-hook state regardless of the magnitude of the common mode induced a.c.

FIG. 2b illustrates an off-hook state of the line, in which the telephone line presents a much lower impedance between the terminals T and R so that the d.c. voltages VT and VR at these terminals are between the reference voltages Vt and Vr, as shown by lines 32 and 34 in FIG. 2b. In the absence of any induced a.c. on the telephone line, this results in the signals C1=1 and C2=1, so that O/P=1 indicating an off-hook state of the telephone line.

In the presence of an arbitrary magnitude of common mode induced a.c. on the telephone line, as shown by sinusoidal curves 36 and 38, in-phase a.c. signal waveforms are superimposed on the d.c. components of the voltages VT and VR. If the induced a.c. is of a sufficient magnitude, then as shown in FIG. 2b the voltages VT and VR cross the reference voltages Vt and Vr respectively at points during the sinusoidal waveform, resulting in the signals C1=0 and C2=0 at certain times as shown at the bottom of FIG. 2b. However, because the signal C2=1 throughout the time during which the signal C1=0, and the signal C1=1 throughout the time during which the signal C2=0, there is no change in the signal O/P, which in accordance with the above truth table remains 1. Thus the telephone line is correctly indicated by the signal O/P as being in the off-hook state regardless of the magnitude of the common mode induced a.c.

The logic 18 can conveniently comprise software, firmware, or hardware responsive to the signals C1 and C2. The comparators 12 and 14 can comprise hardware comparators responsive to the actual voltages VT, VR, Vt, and Vr or to fractions of these voltages, or can comprise software comparators which are responsive to digital values representing the actual voltages, the digital values representing the voltages VT and VR being produced for example by analog-to-digital converters having inputs coupled to the terminals T and R. FIG. 3 illustrates an embodiment of the invention in which the comparators and logic are implemented in hardware.

Referring to FIG. 3, the comparator 12 comprises a differential amplifier having its inverting (−) input coupled via a current limiting resistor 20 to a tapping point of a potential divider, formed by two resistors 42 coupled between the terminal T and ground, and having a voltage proportional to the reference voltage Vt, produced at the tapping point of a potential divider formed by two resistors 44 connected between the supply voltages, coupled to its non-inverting (+) input via another current limiting resistor 20. An output of the differential amplifier has its level shifted to the range of 0 volts (logic 0, VT>Vt) to +5 volts (logic 1, VT<Vt) by a level-shifting circuit comprising two resistors 46 and a diode 48, thereby producing the signal C1.

Correspondingly, the comparator 14 comprises a differential amplifier having its non-inverting (+) input coupled via a current limiting resistor 20 to a tapping point of a potential divider, formed by two resistors 52 coupled between the terminal R and ground, and having a voltage proportional to the reference voltage Vr, produced at the tapping point of a potential divider formed by two resistors 54 connected between the supply voltages, coupled to its inverting input via another current limiting resistor 20. An output of the differential amplifier has its level shifted to the range of 0 volts (logic 0, VR<Vr) to +5 volts (logic 1, VR>Vr) by a level-shifting circuit comprising two resistors 56 and a diode 58, thereby producing the signal C2.

The logic 18 in the arrangement of FIG. 3 comprises a NAND gate 60 having two inputs to which the signals C1 and C2 are supplied, an OR gate 62 having two inputs to which the signals C1 and C2 are supplied, and a bistable device or flip-flop 64 having an active-low set input S connected to the output of the NAND gate 60, an active-low clear input C connected to the output of the OR gate 62, and an output Q at which the signal O/P is produced. When the signals C1 and C2 are both a logic 1, the output of the NAND gate 60 is a logic 0, setting the flip-flop 64 so that its output Q is a logic 1. When the signals C1 and C2 are both a logic 0, the output of the OR gate 62 is a logic 0, clearing or resetting the flip-flop 64 so that its output Q is a logic 0. When one of the signals C1 and C2 is a logic 0 and the other is a logic 1, the outputs of the gates 60 and 62 are both a logic 1, and there is no change in the state of the flip-flop 64. Thus the operation of the gates 60 and 62 and the flip-flop 64 can be seen to correspond to the truth table above.

Figure 4:
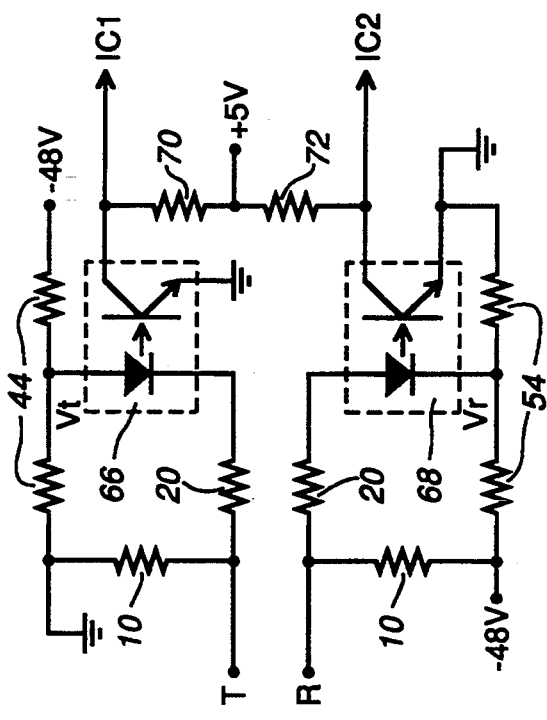
FIG. 4 is a circuit diagram illustrating an alternative form of part of the line detector in accordance with another embodiment of the invention.

FIG. 4 illustrates an alternative arrangement in which the comparators 12 and 14 are constituted by opto-couplers 66 and 68 producing signals IC1 and IC2 which are the inverse of the signals C1 and C2 respectively.

The opto-coupler 66 comprises a light-emitting diode, connected on one side to the tapping point of the potential divider formed by the resistors 44 and defining the reference voltage Vt and on the other side via a current limiting resistor 20 to the terminal T, and a photo-transistor having its emitter grounded and its collector, at which the signal IC1 is produced, connected via a pull-up resistor 70 to a supply voltage of +5 volts. Similarly, the opto-coupler 68 comprises a light-emitting diode, connected on one side to the tapping point of the potential divider formed by the resistors 54 and defining the reference voltage Vr and on the other side via a current limiting resistor 20 to the terminal R, and a photo-transistor having its emitter grounded and its collector, at which the signal IC2 is produced, connected via a pull-up resistor 72 to the supply voltage of +5 volts. The diodes in the opto-couplers 66 and 68 are poled to emit light when VT<Vt and when VR>Vr, respectively, these conditions corresponding to the off-hook state, and involving the least power consumption in the on-hook state which occurs most of the time.

Although particular embodiments of the invention have been described in detail, it should be appreciated that numerous modifications, variations, and adaptations may be made without departing from the scope of the invention as defined in the claims.

What is claimed is:

1. A line detection arrangement for detecting a state of a two-wire telecommunications line having a first wire and a second wire, comprising:
   a first comparator arranged to compare a first voltage on the first wire of the line with a first reference voltage;
   a second comparator arranged to compare a second voltage on the second wire of the line with a second reference voltage, the second reference voltage being more negative than the first reference voltage; and
   logic responsive to outputs of the first and second comparators for determining a first state of the line when the first voltage is more negative than the first reference voltage and the second voltage is more positive than the second reference voltage, determining a second state of the line when the first voltage is more positive than the first reference voltage and the second voltage is more negative than the second reference voltage, and otherwise maintaining a previous determination of the state of the line.

2. A line detection arrangement as claimed in claim 1 wherein the logic comprises a bistable stage having two states corresponding to the first and second states of the line, and two gates each responsive to the outputs of the comparators for controlling the bistable stage.

3. A line detection arrangement as claimed in claim 1 wherein each of the first and second comparators comprises a differential amplifier.

4. A line detection arrangement as claimed in claim 3 wherein each of the first and second comparators further comprises a level shifting circuit coupled to an output of the respective differential amplifier.

5. A line detection arrangement as claimed in claim 1 wherein each of the first and second comparators comprises an opto-coupler including a light emitting diode.

6. A line detection arrangement as claimed in claim 5 wherein the light emitting diode of each opto-coupler is coupled between a respective terminal for connection of a respective wire of the line and the respective reference voltage with a polarity for emitting light in the first state of the line.

7. A detection arrangement comprising two comparators each arranged to compare a voltage on a respective wire of a two-wire telephone line with a respective reference voltage and to produce a respective comparator output signal indicating whether the line has a first state with a relatively low impedance between the two wires or a second state with a relatively high impedance between the two wires, and majority decision logic responsive to the two comparator output signals to determine the state of the line, whereby the detection arrangement is insensitive to common mode induced a.c. on the line.

8. A method of detecting a state of a two-wire telecommunications line, comprising the steps of:
   determining first and second reference voltages, the second reference voltage being more negative than the first reference voltage;
   determining a first state of the line in response to the voltage on a first one of the two wires of the line being more negative than the first reference voltage and the voltage on a second one of the two wires of the lint being more positive than the second reference voltage;
   determining a second state of the line in response to the voltage on the first one of the two wires of the line being more positive than the first reference voltage and the voltage on a second one of the two wires of the line being more negative than the second reference voltage; and determining no change in the state of the line in response to the voltage on the first one of the two wires of the line being more positive than the first reference voltage and the voltage on the second one of the two wires of the line being more positive than the second reference voltage, and in response to the voltage on the first one of the two wires of the line being more negative than the first reference voltage and the voltage on the second one of the two wires of the line being more negative than the second reference voltage.

* * * * *